(12) United States Patent
Faria et al.

(10) Patent No.: US 7,359,647 B1
(45) Date of Patent: Apr. 15, 2008

(54) METHOD AND APPARATUS FOR TRANSMITTING AND RECEIVING POWER OVER OPTICAL FIBER

(75) Inventors: Roberto Faria, Kanata (CA); Dominic J. Goodwill, Kanata (CA)

(73) Assignee: Nortel Networks, Ltd., St. Laurent, Quebec (CA)

( * ) Notice: Subject to any disclaimer, the term of this patent is extended or adjusted under 35 U.S.C. 154(b) by 573 days.

(21) Appl. No.: 10/819,309

(22) Filed: Apr. 6, 2004

(51) Int. Cl.
*H04B 10/00* (2006.01)
*H04B 1/16* (2006.01)

(52) U.S. Cl. .................... 398/171; 398/113; 455/343.1

(58) Field of Classification Search ................ 398/171, 398/113, 104, 105; 455/343.1, 343.2, 343.6
See application file for complete search history.

(56) References Cited

U.S. PATENT DOCUMENTS

| | | | | |
|---|---|---|---|---|
| 4,710,977 A | * | 12/1987 | Lemelson | .................... 398/171 |
| 5,193,201 A | * | 3/1993 | Tymes | ......................... 708/191 |
| 5,271,075 A | | 12/1993 | Gfeller et al. | |
| 5,408,536 A | | 4/1995 | Hart | |
| 5,528,409 A | * | 6/1996 | Cucci et al. | .................... 398/15 |
| 5,575,860 A | | 11/1996 | Cherney | |
| 5,664,035 A | | 9/1997 | Tsuji et al. | |
| 5,777,769 A | * | 7/1998 | Coutinho | .................... 398/171 |
| 5,796,890 A | * | 8/1998 | Tsuji et al. | .................... 385/24 |
| 5,859,719 A | * | 1/1999 | Dentai et al. | ............... 398/141 |
| 6,362,906 B1 | * | 3/2002 | O'Shea | ....................... 398/126 |
| 2003/0123879 A1 | * | 7/2003 | Gayrard et al. | ............... 398/82 |
| 2004/0165884 A1 | * | 8/2004 | Al-Chalabi | .................. 398/14 |
| 2005/0147409 A1 | * | 7/2005 | Colven et al. | ................. 398/5 |

* cited by examiner

*Primary Examiner*—Jason Chan
*Assistant Examiner*—Nathan Curs
(74) *Attorney, Agent, or Firm*—John C. Gorecki

(57) ABSTRACT

A method and apparatus for transmitting and receiving power over optical fiber is disclosed. In particular, a power over fiber system in which an optical network transmits electrical power via an optical signal and is also transmits data within the optical network as well. The optical signals include a high frequency data portion that includes the data to be transmitted, and either a constant or low frequency power signal portion. The optical signal is received and converted into an electrical signal by a photodetector/photodiode that is electrically filtered to separate the data signal from the power signal. The data signal is then processed using known techniques. The power signal can be conditioned and/or regulated, if necessary, and provided either directly to a terminal piece of equipment to provide all the required power thereto, or may be combined with locally provided power to contribute at least a portion of the power required by the equipment. The terminal piece of equipment may be a wireless access point.

18 Claims, 6 Drawing Sheets

METHOD AND APPARATUS FOR TRANSMITTING AND RECEIVING POWER OVER OPTICAL FIBER

BACKGROUND OF THE INVENTION

1. Field of the Invention

The present invention relates generally to providing power in devices in a communication network and, in particular, to a method and apparatus for transmitting and receiving power over optical fiber.

2. Description of the Related Art

Optical fiber and copper wire are used extensively in the telecommunications area to transmit data. Of these two technologies, optical fiber is generally able to transmit larger quantities of data than copper wire, and is therefore being deployed to enable higher bandwidth communication services to be provided on existing networks. Additionally, optical fiber has other advantages, such as its ability to transport data without transporting electricity, which make it desirable in particular applications where transmission of electricity may be disadvantageous, such as where the channel may subject to a lightning strike.

Optical networks, like other networks, may require regeneration of optical signals on the network. However, optical networks do not carry electricity, thus requiring optical components on the network to be powered by a local power source. Additionally, optical signals typically need to be transformed into electrical signals for processing in the end devices, thus requiring the end devices to also be connected to a source of local power. Establishing local power source connections increases installation costs and also increases operational costs. Specifically, the local power will need to be supplied and paid for by one or more parties that own, operate, or use the system. Accordingly, it would be advantageous to reduce external power requirements for network elements on a communications network.

SUMMARY OF THE INVENTION

The present invention is directed to a method and apparatus for transmitting and receiving power over optical fiber. Power may be provided over an optical fiber system by providing an optical power converter to extract electrical power from the signals on the optical fiber. The power may be obtained from dedicated signals, from the data signal, or from a combination of signals. Optionally, the electrical power obtained from the optical signal may be combined with a source of local power. According to an embodiment of the invention, the optical signal includes a high frequency data portion that includes the data to be transmitted, and low frequency power signal portion. When the optical signal is received and converted into an electrical signal, the electrical signal will also include both a high frequency data signal and a low frequency power signal. The electrical signal is filtered to separate the data signal from the power signal, and the data signal is processed using known techniques. The power signal can be conditioned and/or regulated, if necessary, and provided either directly to a terminal piece of equipment, or may be combined with locally provided power to contribute at least a portion of the power required by the equipment. Optionally, the power may be stored in a local resident power supply, such as a battery, and charged by the optical power signal when the equipment is not in use.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
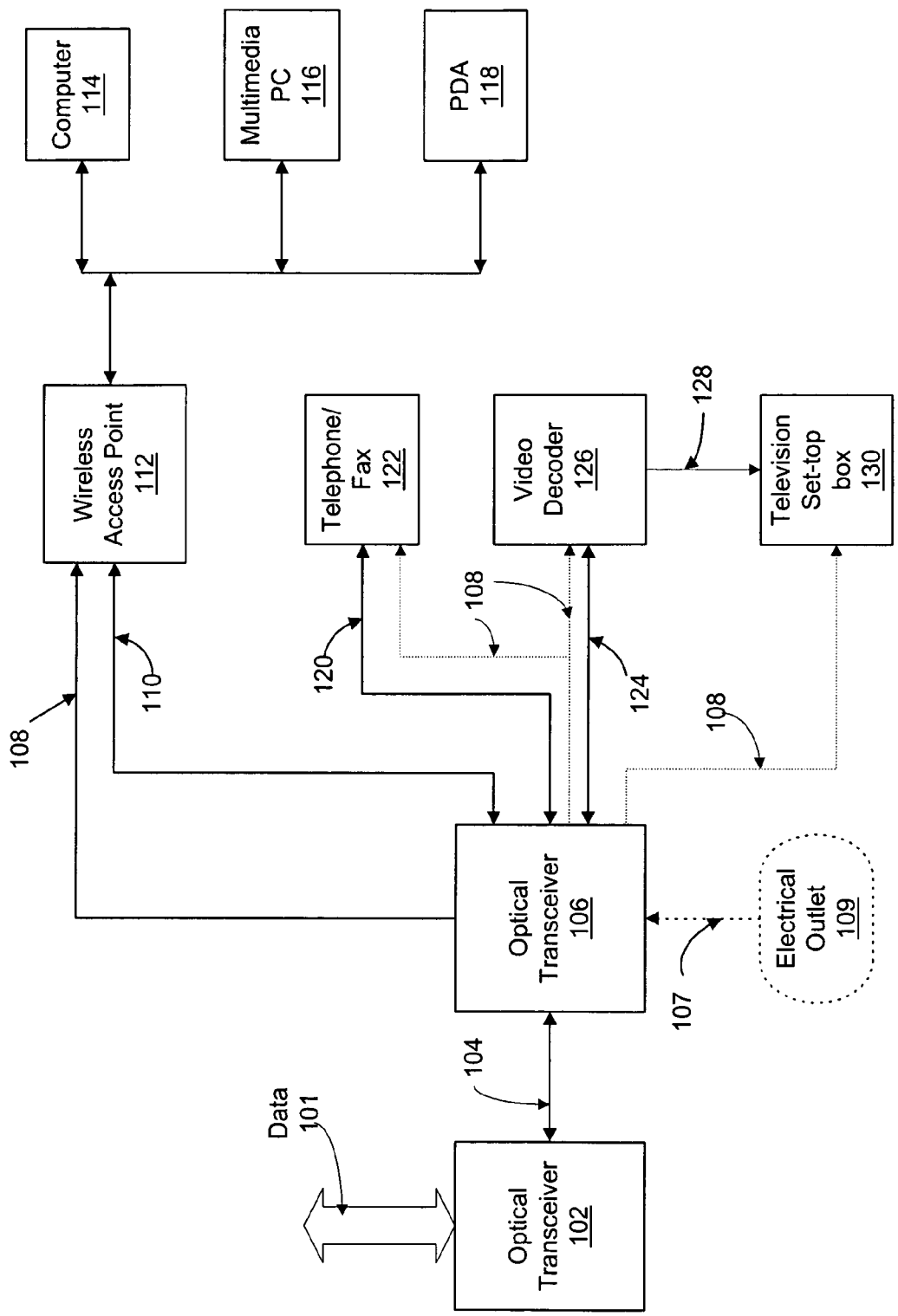
FIG. 1 is a functional block diagram of an optical communication system including an optical transceiver that is configured to receive and process optical signals that transfer power over the optical fiber system in accordance with an embodiment of the present invention.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

The present invention is directed toward transmitting and receiving power over optical fiber. Electrical power may be transmitted within an optical network via an optical fiber to provide total or partial power to one or more electrical devices on the optical network. Depending on the implementation of the embodiment of the invention, the optical signals may be dedicated power signals, combination power and data signals, data signals, and may be used to provided all the power for the device or may be used to provide partial power for the device. Optionally, where the device includes a local power storage device, such as a battery, the optical power may be used to charge the local storage device when the electrical device is not consuming power from the local storage device. These and other embodiments will be described in greater detail below.

There are three common modulation schemes used in conventional optical networks—non-return-to-zero (NRZ) modulation schemes: return-to-zero (RZ) modulation schemes, quadrature amplitude modulation. (QAM)

schemes, and phase shift keyed (PSK) modulation schemes. Embodiments of the invention may use one or more of these schemes or, optionally, a combination of the schemes or other to-be-developed schemes.

In the NRZ modulation scheme, a laser source that is generating the optical signal is always producing light, i.e., the optical signal does not return to zero intensity intermediate broadcasting states. To transmit data, the intensity of the optical signal is varied according to the particular high frequency optical modulation/encoding scheme being used. Thus, in a NRZ system, the optical signal provides a low frequency or relatively constant power signal that can be utilized to provide power over the fiber even as the intensity of the optical signal is varied to transmit data.

In a return-to-zero (RZ) modulation scheme, the laser source that is generating the optical signal is switched on and off. To transmit data, the optical signal is switched on and off according to the particular high frequency optical modulation/encoding scheme being used. As is well known in the art, an RZ scheme has a large delta-function power spectral component at a frequency of 0 Hz. According to an embodiment of the invention, in a RZ system, the 0 Hz-frequency power spectral component is utilized to provide power over the fiber.

In the WAM modulation scheme and the PSK modulation scheme, a laser source that is generating the optical signal is always producing light, i.e., the optical signal does not return to zero intensity intermediate broadcasting states. To transmit data, the intensity and/or phase of the optical signal is varied according to the particular high frequency optical modulation/encoding scheme being used. Thus, in a QAM or PSK system, the optical signal provides a low frequency or relatively constant power signal that can be utilized to provide power over the fiber even as the intensity of the optical signal is varied to transmit data.

According to another embodiment of the invention, an additional low frequency power signal is mixed with the high frequency data signal, which may be of NRZ scheme, RZ scheme, OAM scheme, PSK scheme, or other scheme, such that the optical signal includes a low frequency power signal that can be utilized to provide power over the fiber even as the optical signal is switched on and off to transmit data. It is envisaged in this embodiment that the low frequency power signal may be filtered at terminating equipment such that the high frequency data signal may be detected.

For the purpose of clarity within this invention, from this point forward the term "low frequency power signal" shall be taken to include those above-mentioned embodiments that include natural low frequency power signal components from the high-frequency data scheme and those embodiments wherein a low frequency power signal is specifically added.

In Wavelength Division Multiplex (WDM) and systems such as a Dense WDM (DWDM) system, the wavelengths of light that are used to transmit data may be used as described above to transmit power in addition to the high frequency data. However, there may be wavelengths that are not needed at a given time to transmit data that may be dedicated to providing power on an ad-hoc basis. In addition, there may be wavelengths that are dedicated on a full-time basis to transmitting power. The power transmitted by these dedicated wavelengths can be combined with the power transmitted by the data wavelengths to provide s composite power signal to the desired piece of equipment. This composite power signal may be further combined with locally provided power if desired.

According to an embodiment of the invention, the low frequency optical signal can be utilized in the embodiments described below to transmit power via the optical signal. At the terminating equipment, at least a portion of the optical signal is optically coupled to a photodetector that converts the received optical signal into an electrical signal. Power can be removed from the electrical signal by low-pass filtering the electrical signal to separate the low frequency power signal components from the high frequency data signal components. The low frequency power signal in this embodiment is provided to power the terminating equipment, such as a wireless network access point.

Thus, the electrical power signal, whether formed using NRZ, RZ, QAM, PSK, or other optical signals, is suitable to power a particular device such as a low power wireless access point or wireless transceiver, or other equipment as required by the circumstances and system requirements. Alternatively, the electrical power signal may be combined with other locally supplied power, via a power combination module, to form a combined power signal. The combined power signal supplies the power required by the various termination equipment and, because a portion of the combined power signal is provided by the electrical signal formed from the received optical signal, the amount of local power that is needed to power the various equipment is therefore reduced. In addition, if a backup battery power supply is provided, the electric power signal may be coupled to the battery to charge the battery e.g., when power is not being drawn from the battery.

In addition, a wavelength division multiplex (WDM) system combines a plurality of optical signals having different wavelengths, each of which may be carrying data, into a composite optical signal that is then transmitted via an optical fiber. Each of the wavelengths that are carrying data may be modulated, transmitted, and processed at the ONU/OLT as described above to provide power to the ONU/OLT equipment. In addition, wavelengths in the WDM system that are not currently being used to transmit data can be used to transmit power in the form of a substantially uniform optical signal, i.e., an optical signal that is not modulated by a high frequency data stream. These unused wavelengths are coupled to one or more photodetectors that convert the substantially unmodulated optical signals into an electrical power signal. The various electrical power signals provided by the various optical signals can be combined to form a composite power signal as described above. The wavelengths within the WDM system that are not being used to transmit data may be optical signals that have been selected to be dedicated to transmitting power signals or may be optical signals that are not needed to transmit data on an ad-hoc basis due to network demand and are used only temporarily to transmit power, or a combination of these methods may be used.

In some of the embodiments described herein, reference is made to a wireless access point transceiver. The wireless access point transceiver can be, for example and without limitation, a wireless local area network (WLAN) transceiver or a wireless personal area networks (WPAN) transceiver. The wireless transceiver may be configured to implement one or more wireless protocols, such as one of the Institute of Electrical and Electronics Engineers (IEEE) 802.11a, 802.11b, 802.11g, 802.15 wireless communication protocols (collectively referred to herein as 802.1x protocols). Of the 802.1x protocols, the 802.11a protocol currently enables communications to take place at up to 54 Mega bits per second (Mbps) in the 5 GigaHertz (GHz) frequency band; the 802.11b protocol currently enables communications to take place at up to 11 Mbps in the 2.4 GHz frequency band, and the 802.11g protocol enables communications at up to 54 Mbps in the 2.4 Ghz frequency band. 802.15 is the Bluetooth standard that allows wireless communications at up to 1 Mbps in the 2.4 GHz band at a line-of-sight distance of up to 10 meters. Bluetooth networks consume very low power, currently at 1 milliwatt (mW), which makes them ideal for the present invention. Communications may also take place utilizing other conventional protocols, such as one of the IEEE 802.16x protocols, the Universal Mobile Telecommunication System (UMTS) wireless communications protocol, HiperLAN, or an emerging protocol such as IEEE 802.18. Although several examples of wireless protocols have been provided, the invention is not limited in this regard as numerous wireless networks may be configured to implement other protocols as well.

Wireless transceivers may be configured to transmit relatively low power signals, e.g., 1 mW for Bluetooth and 100 mW to 1 W for 802.11x. Thus, depending on the particular configuration a wireless transceiver may have relatively small power requirements. Depending upon the configuration and the particular class of laser used, a laser in an optical network may transmit between 0.63 mW (−2 dBm) to as high as 164 mW (+22.18 dBm) for a class 1M laser, according to draft optical safety specifications defined by the Food and Drug Administration (FDA). Depending upon the characteristics of the optical network, this can result in a received optical power of between 0.27 mW (−5.7 dBm) to as high as 70 mW (+18.45 dBm). Thus, optical power may advantageously be used to power WLAN antennas and other network elements with relatively low power requirements. Other embodiment of the present invention may be configured with lasers that transmit powers in excess of the class 1M limits, and in such embodiments the received optical power may advantageously be higher than the example provided above. In general, the optical power values provided herein should be considered as examples only, and the present invention is not limited to use these particular values.

In some embodiments, the optical transceiver may be used on a Passive Optical Network (PON) that is part of the Fiber To The Home/Business FTTH/B network and in which the PON includes other optical components, such as Optical Network Units (ONUs) and/or an Optical Line Terminals (OLTs). In addition, the power over fiber system described herein may provide power to other systems within the FTTH/B network, other than systems configured as data transceiving systems. For example, the power over fiber system described herein may be used to provide power to an active PON splitter/amplifier. In another example embodiment, optical fibers in a PON are typically deployed as a plurality of optical fiber segments that are joined/fused together. Thus, a break in a segment, or at a junction between adjacent segments results in a loss of signal to down-stream subscribers/customers. In order to identify the location of the break to reduce the outage time the power over fiber system described herein may be used to provide power to an emergency beacon system located before the break. The invention is not limited to use on a passive optical network, however, but rather may be used on other types of optical networks.

FIG. 1 depicts an embodiment of a power over fiber system in which the power provided by the optical signal is used to power a wireless access point transceiver. In particular, an optical transceiver 102 receives data 101 from one or more data sources, not shown. In the event that there are a plurality of data sources, the optical transceiver 102 multiplexes the various data streams together and modulates an optical signal with the multiplexed data using a modulation scheme as described above. The optical transceiver 102 transmits the modulated optical signal via optical fiber 104 to an optical transceiver 106 that receives the optical signal. The optical signal provided by the optical fiber 104 and received by the optical transceiver 106 is processed as described below and separated into a power signal 108 and one or more data signals, such as such as a wireless access point data signal 110, a telephone/fax data signal 120, or a video decoder data signal 124.

The data signal 110 that includes digital data for processing is provided to a wireless access point transceiver 112. The wireless access point transceiver 112, which as discussed above may be a WLAN or a WPAN, can be wirelessly coupled to a variety of equipment that is operative to receive and transmit wireless data from and to the wireless access point transceiver 112. This equipment can include for example and without limitation: a laptop computer, a desktop computer, or thin client 114; a multimedia computer or workstation 116; or a personal digital assistant or cell phone 118. The voice/fax data signal 120 is provided to a telephone/fax device 122. The video data 124 is provided to video decoder 129 that processes the video data and provides video signals to a TV set top box 130. Other data that may be needed within the home or business can also be provided via these or other optical signals as needed.

The transceiver also provides a power signal 108 that may be supplied to one of the devices configured to receive data over the optical fiber or to another electronic device. For example, the power signal may be supplied to the wireless access point 112, to the telephone/fax module 122, to the video decoder 126, to the television set-top box 130, or to another electronic device. Optionally, the optical transceiver 106 may receive local power 107 via a local electrical outlet or via another connection to the local power system. In addition, although the illustrative embodiment shown in FIG. 1 shows the optical transceiver 106 as being a separate module from the wireless access point 112 and other network devices, in other embodiments the optical transceiver 106 may be integral with the wireless access point 112, or one or more of the other network devices.

Figure 2:
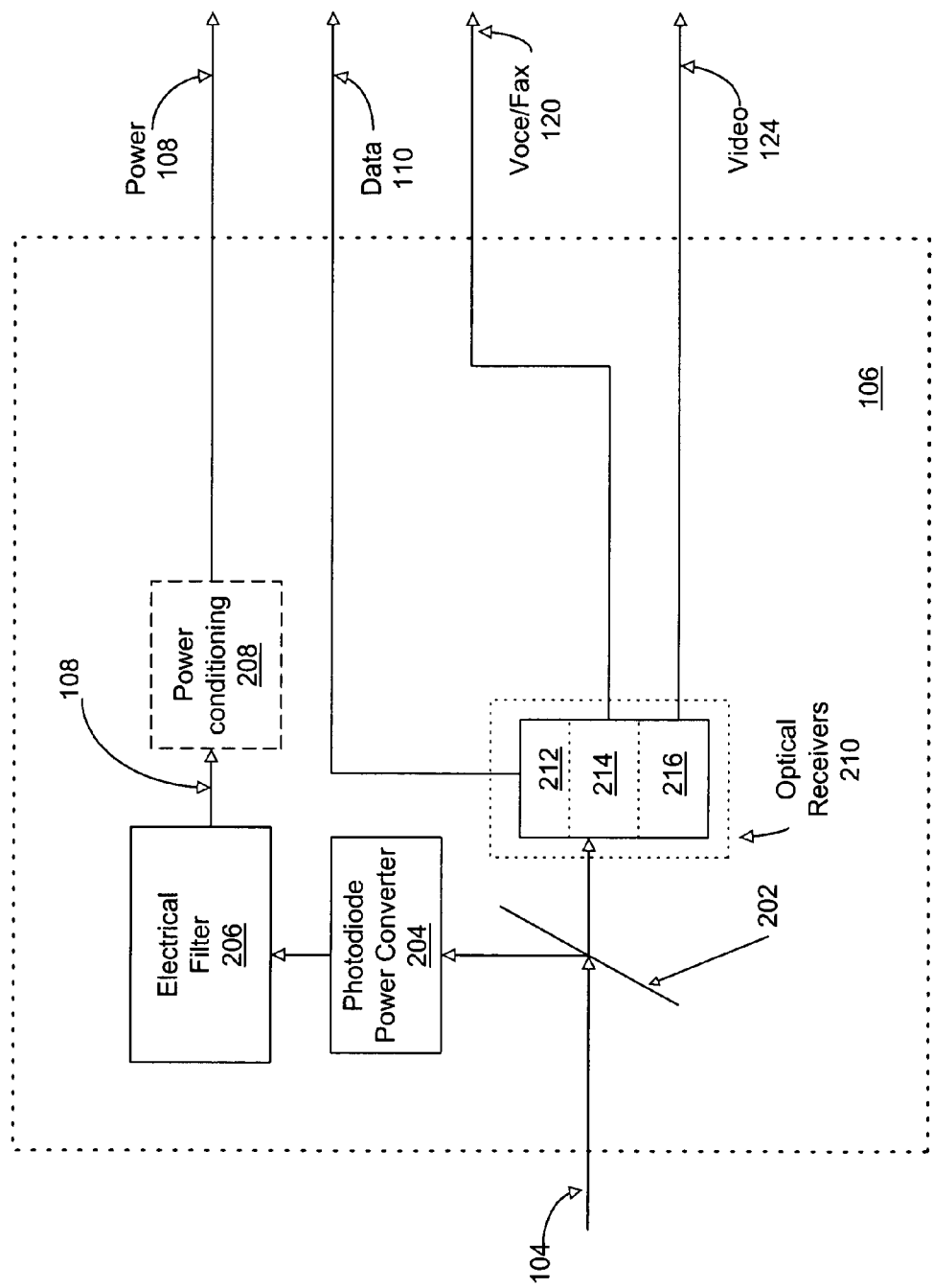
FIG. 2 is a functional block diagram of an embodiment of the optical transceiver depicted in FIG. 1.

FIG. 2 depicts one embodiment of the optical transceiver 106 of FIG. 1 that includes an optical beam splitter 202 optically coupled to the optical signal provided by optical fiber 104. The beam splitter 202 may be, without limitation, a free-space beam splitter or a fiber splitter. The beam splitter 202 provides a first optical signal to a photodiode power converter 204 that converts the first optical signal into an electrical signal 205 and provides the electrical signal 205 to an electrical filter 206. The electrical filter 206 is operative to separate the low frequency power signal from said first optical signal. Thus, the electrical filter 206 includes a low pass filter that is operative to pass only the low frequencies of electrical signal 205 to form the power signal 108. If the power signal 108 requires conditioning, regulating, or other processing the power signal is then provided to an optional power conditioning module 208. The power conditioning module is operative to process the power signal as needed as is known in the art. The power signal 108 is then provided to the desired piece of equipment as described above. The photodiode power converter 204 may be a wide bandwidth device, or may be a narrow bandwidth device that is optimized to receive a single wavelength or a narrow band of optical wavelengths centered on the wavelength of the optical signal transmitted by the optical transmitter 102. The amount of current produced and the required conversion efficiency are selected based on the amount of power that is required by the equipment that is to be powered by the power signal 108.

The optical signal received from fiber 104 that passes through the beam splitter 202 is provided to one or more optical receivers 210 that typically include a photodetector or photo-diode to receive the optical signal and convert it to an electrical signal. In the illustrated embodiment, the one or more optical receivers 210 includes three optical receivers: optical receiver 212, 214, and 216. Each of the optical receivers may further include other optical components and any associated electronics and software to enable it to provide the proper output signals. In addition, a controller (not shown) may be provided to control the one or more optical receivers 210 to de-multiplex the optical signal. Thus, optical receiver 212 receives the optical signal provided by fiber 104 and provides the digital data 110 that is utilized as discussed above. Optical receiver 214 receives the optical signal provided by fiber 104 and provides the voice/fax data 120 that is also utilized as discussed above. Optical receiver 216 receives the optical signal provided by fiber 104 and provides the video data 124 that is utilized as discussed above.

Figure 3:
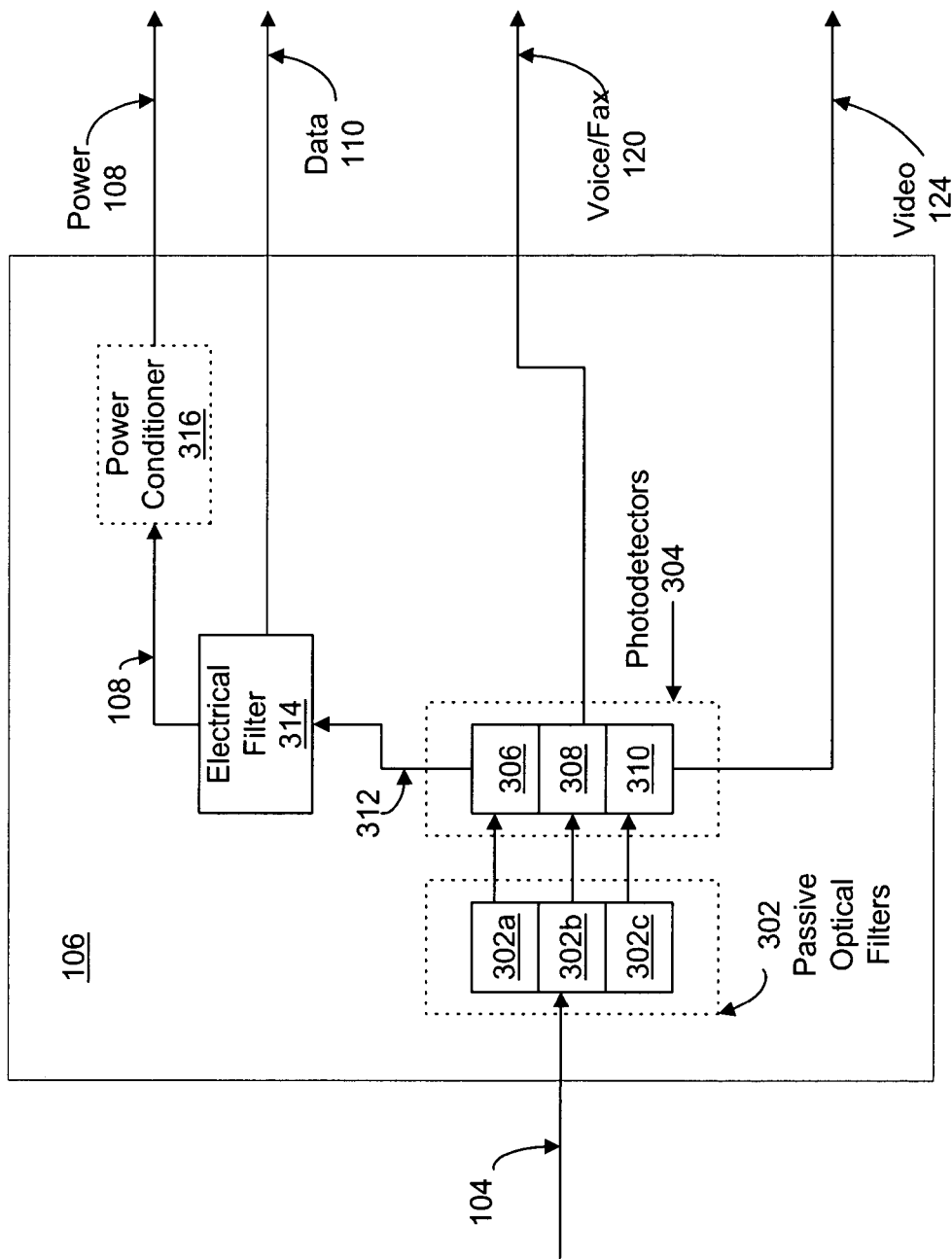
FIG. 3 is a functional block diagram of another embodiment of the optical transceiver depicted in FIG. 1.

FIG. 3 depicts another embodiment of the optical transceiver 106 that receives the optical signal via the optical fiber 104. In the embodiment depicted in FIG. 3, the optical signal is a wavelength division multiplexed (WDM) optical signal that includes three wavelengths. Thus, the optical transceiver 106 includes a bank of passive optical filters 302 that receive the WDM optical signal from the optical fiber 104. The passive optical filters 302 each have a passband wavelength that selects a predetermined wavelength of the WDM optical signal and provides the selected wavelength to a respective one of the optical receivers/photodetectors 304 that is sensitive to that particular wavelength. Thus in the illustrative embodiment of FIG. 3, passive optical filter 302a provides a predetermined wavelength of the optical signal to photodetector 306; passive optical filter 302b provides a second predetermined wavelength of the optical signal to photodetector 308, and passive optical filter 302c provides a third predetermined wavelength of the optical signal to photodetector 310. Thus, each optical filter removes any optical signals having a wavelength that is outside their respective passband and therefore only the optical signal having a wavelength that corresponds to the passband of the optical filter is optically coupled to the corresponding one of the plurality of optical photodetectors 304.

In the embodiment depicted in FIG. 3, the wavelength of light corresponding to photodetector 306 also includes a power portion in addition to the data portion. Photodetector 306, receives the optical signal having the correct wavelength from passive optical filter 302a and provides an electrical signal 312 to electrical filter 314. The electrical filter is operative to separate the low frequency power signal and the high frequency data signal from the electrical signal 312 and is further operative to provide these separate signals as distinct outputs. Thus, electrical filter 314 includes a low pass filter and a high pass filter, or a combination of filter types that can separate the electrical signal 312 into a high frequency data signal 110 and a low frequency power signal 108. As described above, the low frequency power signal 108 may require power conditioning or regulation and, if necessary, may be coupled to a power conditioning module 316. The low frequency power signal 108 and the high frequency data signal 110 are then utilized as described above.

Similarly, the photodetector 308 receives the optical signal having the correct wavelength from passive optical filter 302b and provides the voice/fax data output signal 120 that is utilized as discussed above. The photodetector 310 receives the optical signal having the correct wavelength from passive optical filter 302c and provides the video data signal 124 that is utilized as discussed above. Although in the embodiment depicted in FIG. 3 only the optical signal coupled to the photodetector 306 is configured to provide a power signal thereto, the optical signals coupled to the other photodetectors 308 and 310 may also be configured to provide a power signal thereto and therefore, power may also be drawn from the other photodetectors 308 and 310 as well.

Figure 4:
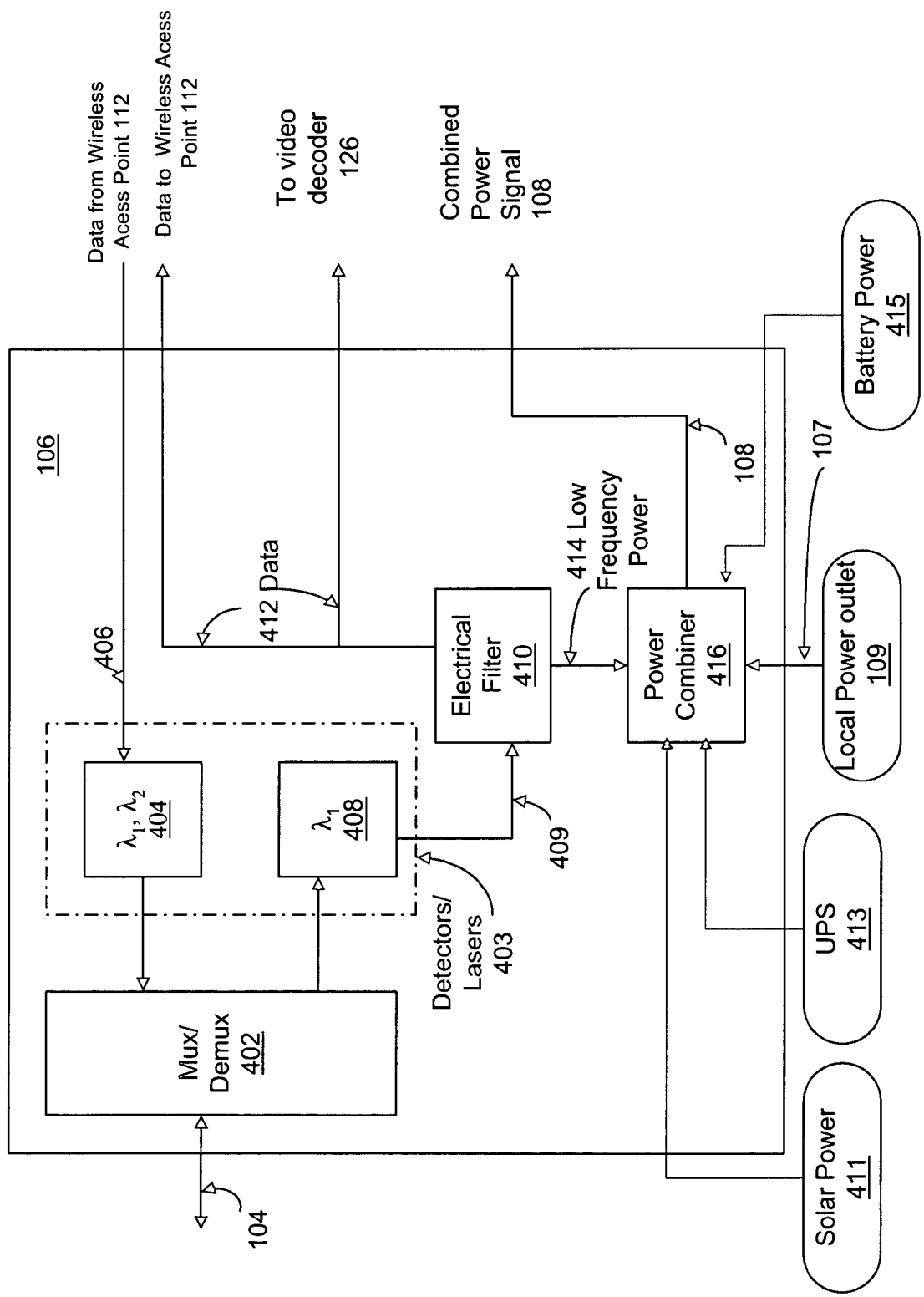
FIG. 4 is a functional block diagram of another embodiment of the optical transceiver in FIG. 1 that includes a standard Passive Optical Network (OPN) Optical Network Unit (ONU) for receiving and processing optical signals used to provide power over fiber in accordance with an embodiment of the present invention.

The embodiment depicted in FIG. 4 includes an optical transceiver 106 that includes an optical mux/demux module 402 that receives the optical signal provided by optical fiber 104. The optical mux/demux module 402 provides the optical signal to a photodetector/laser module 403 that includes a photodetector 408 that is sensitive to an optical wavelength of $\lambda_1$ and a laser 404 capable of transmitting on one or more wavelengths $\lambda_1$ $\lambda_2$. The laser 404 receives data 406 from the wireless access point 112, described above, and provides an output optical signal having a wavelength of $\lambda_1$ or $\lambda_2$ to the optical mux/demux module 402. Photodetector 408 receives an optical signal from the optical mux/demux module 402 having a wavelength of $\lambda_1$ that includes a power portion and a data portion. The photodetector 408 is operative to convert the received optical signal into an electrical signal 409. The electrical signal 409 is coupled to the electrical filter 410 that is operative to separate the electrical signal into a high frequency data portion and a low frequency power portion. The high frequency data portion is then provided as data 412 to one or more of the electronic devices, such as the wireless access point 112 and to the video decoder 126 both of which are described above. In this embodiment, the data 412 is provided to both the wireless access point 112 and the video decoder 126 and therefore each must be able to discern the appropriate data itself, or a module, not shown, may be provided to separate the data between the two devices.

The electrical filter 410 also provides a low frequency power signal 414 to power combiner module 416. The power combiner 416 may also receive other power as well. For example, the power combiner 416 may receive local power 107 from an electrical outlet 109 or another connection to the local electrical system, electrical power from a solar power system 411, electrical power from an uninterrupted power supply system (UPS) 413, or power from a battery back up system 415. The system can be adapted to receive power from a variety of sources other than those listed here as well. The power combiner 416 is operative to condition and/or regulate, if necessary, the power signal 414 and the power received from the various sources coupled thereto. In addition, the power combiner 416 is further operative to select from among the various power signals to satisfy the power requirements and to combine the power from the various sources to form a combined power signal that is output as power signal 108 and utilized to provide power to one or more pieces of equipment as described above. For example, the power combiner may select according to a predetermined priority system based on cost, availability, or other factors based on the system needs. For example, the power combiner 416 may first select power from the power over fiber system, next select power from the solar power system 411, next select local electrical power from the outlet 109 or other connection to the local power system, next would be the UPS 413, and last would be power provided by the battery supply 415. Other orders may be used depending on cost, availability, and system requirements. In addition the power combiner 416 may serve to transmit power from a plurality of the power sources to a non-intersecting plurality of the power sources 414, 411, 413, 109, 415. For example, at a given moment in time, the power combiner 416 may select power from the power over fiber system and use such power both to provide the combined power signal 108 and to charge a battery (not shown) by means of the power connection 415. In one embodiment, $\lambda_1$ is equal to 1310 nm and $\lambda_2$ is equal to 1510 nm, although the invention is not limited to an embodiment using these particular wavelengths.

Figure 5:
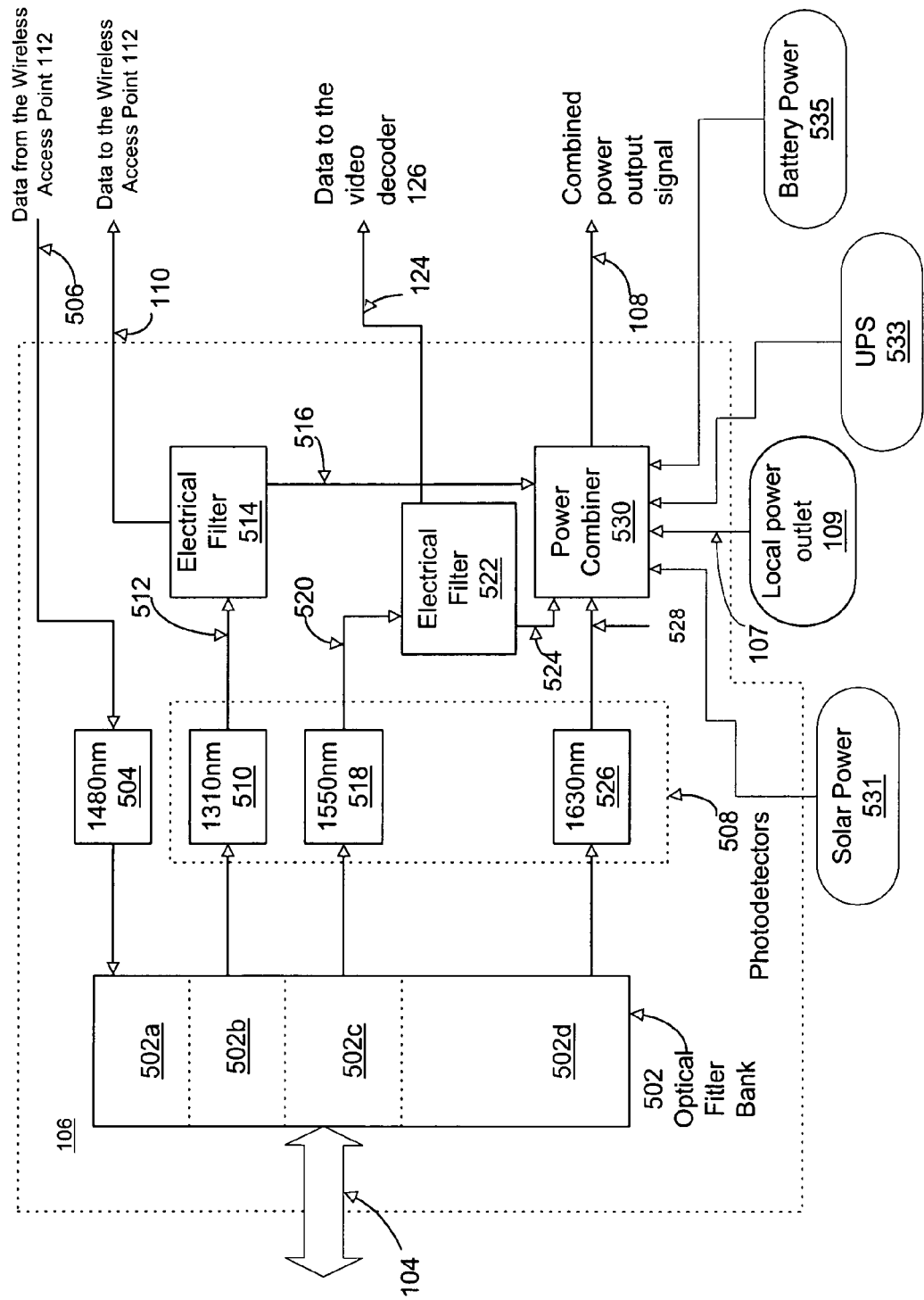
FIG. 5 is a functional block diagram of another embodiment of the optical transceiver in FIG. 1 that includes a Wavelength Division Multiplex (WDM) PON ONU/Optical Line Terminator (OLT) configured to receive and process power over fiber in accordance with an embodiment of the present invention.

FIG. 5 depicts another embodiment of the invention in which a course wave division multiplex (CWDM) system utilizes one or more of the multiplexed optical wavelengths to transmit a data signal (which optionally may be used to transmit a power signal as well). In addition, the CWDM system depicted in FIG. 5 may also include one or more wavelengths that are dedicated to providing only a power signal and therefore do not transmit any data.

The system depicted in FIG. 5 includes an optical filter bank 502 coupled to the optical signal provided by fiber 104. The optical filter bank 502 includes individual optical filters 502*a-d*. Each filter is operative to filter an incoming optical signal and pass optical signals having a wavelength within an optical passband centered a predetermined wavelength $\lambda_a \ldots \lambda_d$, respectively. Laser 504 receives data 506 from the wireless access point 112 and is operative to modulate the laser output signal having a wavelength of $\lambda_a$ accordingly. The laser output signal from laser 504 is optically coupled to optical filter 502*a* that has a passband that includes wavelength $\lambda_a$. The laser output signal is then coupled to optical fiber 104 for transmission. Optical filter 502*b*, which has a passband that includes wavelength $\lambda_b$, is operative to pass light of wavelength $\lambda_b$ to photodetector 510 that provides a corresponding electrical signal 512 that includes both a data portion and a power portion to electrical filter 514. Electrical filter 514 is operative to separate the electrical signal 512 into a high frequency data portion and a low frequency power portion 516. The high frequency data portion is then provided as data 110 to the wireless access point 112 as discussed above. The low frequency portion 516 is provided to a power combiner 530. Similarly, optical filter 502*c*, which has a passband that includes wavelength $\lambda_c$, is operative to pass light of wavelength $\lambda_c$ to photodetector 518 that provides a corresponding electrical signal 520 that includes both a data portion and a power portion to electrical filter 522. Electrical filter 522 is operative to separate the electrical signal 520 into a high frequency data portion and a low frequency power portion 524. The high frequency data portion is then provided as data 124 to the video decoder 126 as discussed above. The low frequency portion 524 is provided to the power combiner 530. Optical filter 502*d* is operative to pass light of wavelength $\lambda_d$, which is dedicated to providing only a power signal and therefore does not have a data signal, to photodetector 526. Thus, the electrical signal 528 provided by photodetector 526 includes only a power portion and does not have to be electrically filtered as the electrical signals corresponding $\lambda_b$ and $\lambda_c$. The electrical signal 528 is provided to power combiner 530.

As discussed above with respect to FIG. 4, power combiner 530 receives the power signals 516, 524, and 528 and, also receives additional power from local power 107 via electrical outlet 109 or other direct connection to the local power system, a solar power system 531, an UPS 533, a battery power system 535, or other suitable power source. The power combiner 530 is operative as described above with respect to FIG. 4 to prioritize the use of the various power sources, to condition and/or regulate as necessary power received from the various power over fiber power signals 516, 524, 528, and power from the other power sources, and to combine these power signals into a composite power signal 108 that is provided as described above to one or more pieces of terminal equipment.

In the embodiment depicted in FIG. 5, the laser may be configured to generate light at a wavelength, $\lambda_a$ of 1480 nm, and the photodetectors 510, 518, and 526 may be configured to receive wavelengths $\lambda_b$, $\lambda_c$, and $\lambda_d$ of 1310 nm, 1550 nm, and 1630 nm respectively. It should be clear that other wavelengths may be used and that the system may include more wavelengths that are required to provide additional data channels that may also include a power portion in one or more channels or to provide additional wavelengths that are dedicated solely to providing power. For example, new optical fiber technology has been developed that do not have a peak in their attenuation curve caused by the addition of water to the optical fiber during manufacturing. These so called "zero waterpeak" optical fibers are able to transmit optical frequencies that are attenuated by conventional fibers and therefore may have many other wavelengths available for transmitting power signals than conventional optical fibers.

Figure 6:
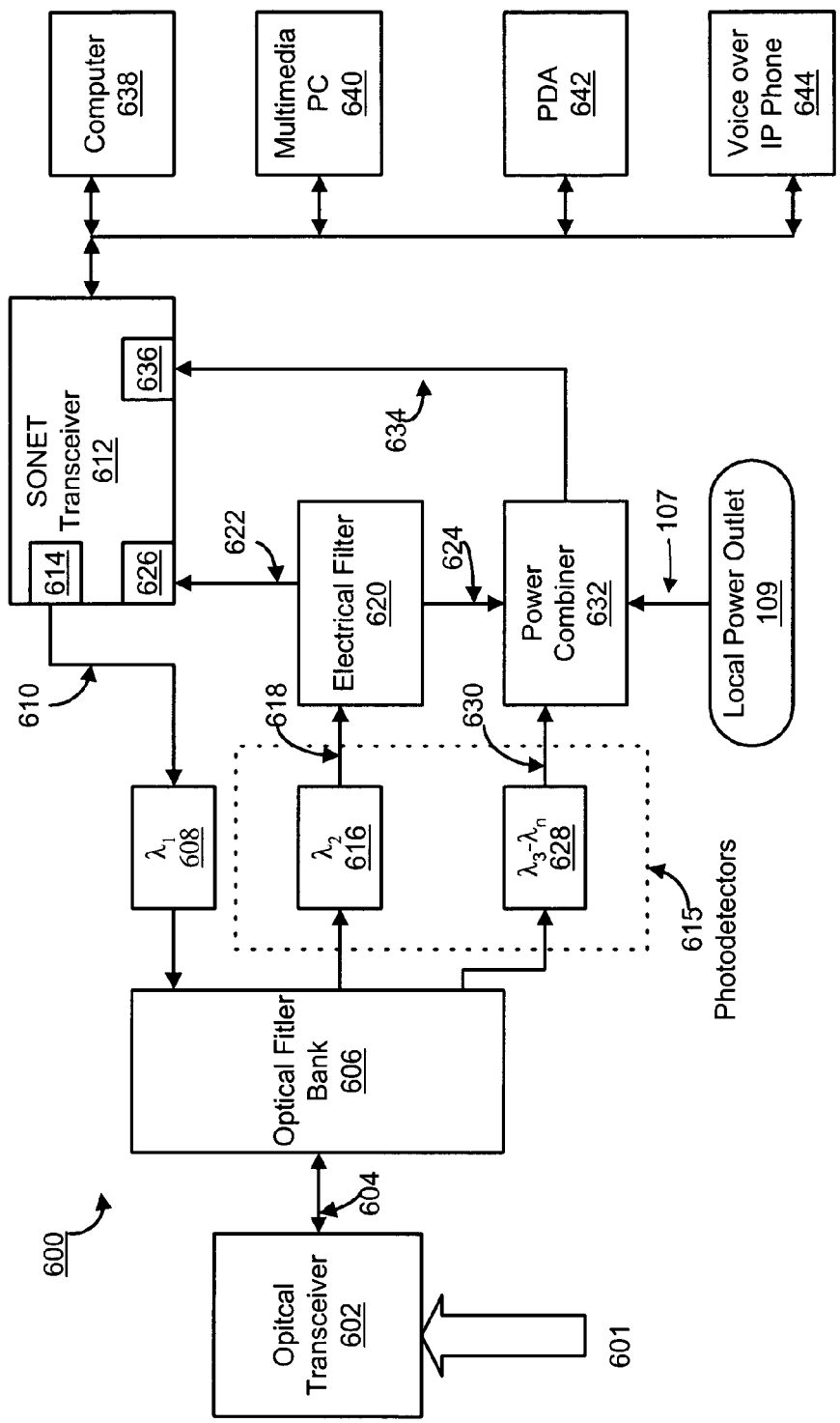
FIG. 6 is a functional block diagram of another embodiment of the optical transceiver in FIG. 1 that includes a Synchronous Optical Network (SONET) WDM Add-Drop Multiplexer (ADM) for receiving and processing power over fiber in accordance with an embodiment of the present invention.

FIG. 6 depicts another embodiment of a system to provide power over fiber in accordance with the present invention. In particular, FIG. 6 depicts a system that includes a synchronous optical network (SONET), or a synchronous digital hierarchy (SDH), WDM add/drop multiplex (ADM) system that utilizes one or more optical data signals to also transfer power and one or more unused optical signals to be dedicated for power transfer only. In particular, the system in FIG. 6 includes an optical transceiver 602 that receives multiple data streams 601-1 . . . 601-n from n-data sources, not shown. The optical transceiver 602 provides n-optical signals each having an individual wavelength and modulates each optical signal according to the SONET standard to carry a corresponding data stream using a modulation scheme as discussed above. The n-optical signals are then wave division multiplexed together to form a composite optical signal that is transmitted via the optical fiber 604 and received by the optical filter bank 606. The optical fiber 604 is also operative to transmit optical signals to the optical transceiver 602. For example, as depicted in FIG. 6, a laser 608 that transmits an optical signal having a wavelength of $\lambda_1$ receives data 610 from SONET transceiver 612 via data output port 614. The laser 608 then provides an optical signal to the optical filter bank 606 that is transmitted via fiber 604 to the optical transceiver 602.

The optical filter bank 606 includes individual optical filters or an optical signal separator. Where, individual optical filters are used, each of the individual optical filters includes a predetermined pass band wavelength $\lambda$ that allows only a particular range of wavelengths of the composite optical signal to pass through. Each of the plurality of photodetectors 608 is a photodetector that is sensitive at a wavelength range that is selected to correspond to the wavelength range of the particular individual optical filter that is optically coupled thereto. For example, photodetector 616 is sensitive to the data/power optical signal having a center wavelength of $\lambda_2$, which corresponds to the center wavelength of the passband of the individual optical filter in the optical filter bank 606 that is optically coupled thereto. Thus, each photodetector receives only the appropriate optical signal that may include both a data portion and a power portion. In addition, there may be one or more optical signals that are either not being used to transmit data and are being used to transmit power on an ad-hoc basis, or are optical signals that have been previously selected to be dedicated to transmitting power. Each of these optical signals has a particular wavelength associated with it and therefore is coupled via an optical filter in the optical filter bank 606 that has a passband centered around the particular wavelength to a corresponding photodetector that is sensitive at the particular wavelength.

Photodetector 616 receives an optical signal having a wavelength of $\lambda_2$ via optical filter bank 606 and converts the received optical signal into an electrical signal 618 that is coupled to electrical filter 620. Electrical filter 620 is operative to separate the data portion 622 of the electrical signal 618 from the power portion 624 of the electrical signal 618 and therefore includes a low pass filter, a high pass filter, or other filter configuration capable of separating the two signals. The high frequency data signal 622 is coupled to the data input port 626 of the SONET transceiver 612. SONET transceiver 612 is further electrically coupled to one or more electronic devices such as: a laptop computer, desktop computer, or thin client 638; a multimedia computer or workstation 640; a personal digital assistant 642, a voice-over-IP telephone 644; or a combination of these or other devices. SONET transceiver 612 is operative to transfer the data contained in the high frequency data signal 624 to and receive data from the various electronic devices coupled thereto and as discussed above, to provide data 610 via data output port 614 to laser 608 for transmission thereby.

The unused wavelengths, i.e., optical signals having wavelengths of $\lambda_3$ to $\lambda_n$, are coupled to photodetectors 628 via the optical filter bank 606. The photodetectors 628 convert the received optical signals into a power signal 630 that are provided to power combiner module 632 as is the low frequency power signal 624. Power combiner module 632 may also receive local power 107 via electrical outlet 109 or other connection to the local electrical system, or power from other sources such as a solar power system, a UPS, or a battery power supply. The power combiner module 632 is operative to condition to prioritize the available power sources as described above with reference to FIG. 4, and to select the power sources in order of the established priority to provide the necessary power. In addition, the power combiner module 632 is operative convert and regulate as necessary the power signal 624, the power signal 630, the local power 107, or the other power sources as needed. The power combiner module 632 is further operative to combine these signals into a composite power signal 634 that is provided to the power input port 636 of SONET transceiver 612. Thus, the power signal 624 and the power signal 630 are able to reduce the amount of local power 107 required by the SONET transceiver 612.

As a variation of the embodiment depicted in FIG. 6, a further embodiment of the invention replaces SONET transceiver 612 with a Synchronous Digital Hierarchy (SDH) transceiver.

It should be appreciated that other variations to and modifications of the above-described apparatus for providing power over a fiber may be made without departing from the inventive concepts described herein. Accordingly, the invention should not be viewed as limited except by the scope and spirit of the appended claims.

What is claimed is:

1. An apparatus for receiving power and data signals using an optical signal within a predetermined wavelength range, the apparatus comprising:
a first optical receiver configured to be optically coupled to an optical fiber carrying an optical signal and configured to receive least a first portion of the optical signal, wherein the optical receiver is operative to convert the intercepted first portion of the optical signal into an electrical signal and to provide the electrical signal as an output;
an electrical filter including a low pass filter portion, the electrical filter having an input electrically coupled to the output of the optical receiver receiving the electrical signal therefrom, the electrical filter being operative to low pass filter the received electrical signal and further operative to provide the low pass filtered electrical signal as a power output signal;
a second optical receiver configured to be coupled to the optical fiber and configured to intercept at least a second portion of the optical signal guided by the optical fiber, wherein the second optical receiver is operative to convert the intercepted second portion of the optical signal into a second electrical signal having a data portion and further operative to provide the second electrical signal as an output; and
a power combination module having a first and second power inputs, and a combination power output, the first power input coupled to the power output signal from the electrical filter and the second power input coupled to an external power source and receiving external power therefrom, the power combination module operative to combine the power output signal and the external power signal into a combined power signal and to provide the combined power signal as a power signal output.

2. The apparatus of claim 1, further including a communication receiver having a data input and a power input, wherein the data input is coupled to the second optical receiver, the communication receiver is configured to receive the second electrical signal therefrom and the power input is coupled to the combined power signal output and is configured to receive the power signal therefrom, wherein at least a portion of the power consumed by the communication receiver is provided by the power signal received from the electrical filter.

3. The apparatus of claim 1, further including a wireless area network hub coupled to the combined power signal output and further coupled to the data signal of the second optical receiver, wherein the wireless area network is configured to receive the combined power signal and data from the second optical receiver via the second electrical signal.

4. The apparatus of claim 3, wherein the wireless area network hub comprises a wireless access point.

5. The apparatus of claim 4, wherein the wireless access point comprises an antenna.

6. An apparatus for receiving power and data signals using an optical signal within a predetermined wavelength range, the apparatus comprising:
an optical receiver coupled to an optical fiber carrying an optical signal within the predetermined wavelength range and operative to convert the optical signal into an electrical signal;
an electrical filter including a low pass filter portion having an input electrically coupled to the optical receiver and receiving the electrical signal therefrom, the electrical filter operative to low pass filter the electrical signal received from the optical receiver and to provide the low pass filtered electrical signal as a power output signal;

the electrical filter further having a high pass filter having an input electrically coupled to the output of the optical receiver and operative to high pass filter the electrical signal received from the optical receiver and to provide the high pass filtered electric signal as a data output signal; and a power combination module having first and second power inputs, and a combination power output, the first power input coupled to the power output signal from the electrical filter and the second power input coupled to an external power source and receiving external power therefrom, the power combination module operative to combine the power output signal and the external power signal into a combined power signal and to provide the combined power signal as a power signal output.

7. The apparatus of claim 6, wherein the power combiner module further includes at least one more additional power input coupled to an additional external power source, the power combiner module being further operative to assign a priority to each of the power sources and to utilize power from each power source according to the priority assigned thereto.

8. The apparatus of claim 7, wherein the additional external power source is selected from the group consisting of a solar power system, a uninterruptible power supply, and a battery power supply.

9. The apparatus of claim 6 wherein the power combination module further has a plurality of power input-outputs, the power input-outputs coupled to a plurality of additional external power devices capable of storing energy, the power combination module operative to take the power from the first power input and to deliver power to the combination power output while sourcing/sinking a balance of power from/to the power input-outputs.

10. The apparatus of claim 9, wherein the power combination module further includes at least one more additional power input coupled to an additional external power source, the power combiner module being further operative to assign a priority to each of the power sources and to utilize power from each power source according to the priority assigned thereto.

11. The apparatus of claim 10, wherein the additional external power source is selected from the group consisting of a solar power system, a uninterruptible power supply, and a battery power supply.

12. The apparatus of claim 6, further including an optical communication receiver having a data input and a power input, wherein the data input is coupled to the data output signal of the electrical filter and wherein the power input is coupled to the combined power signal of the power combination module, wherein the optical communication receiver is configured to consume power provided by the combined power signal received from the power combination module.

13. The apparatus of claim 12, further including a wireless access point coupled to the combined power signal and further coupled to the data output signal, wherein the wireless area network is configured to receive power from the combined power signal and is configured to receive data from the electrical filter via the data output signal.

14. The apparatus of claim 13, wherein the wireless access point comprises an antenna.

15. A method for providing power over an optical fiber, the method comprising the steps of:
generating an optical signal having a low frequency power portion and a high frequency data portion;
transmitting the optical signal via an optical fiber;
receiving the optical signal;
converting the optical signal to an electrical signal;
filtering the electrical signal to separate the low frequency power signal from the high frequency data signal; and
combining the low frequency power signal with an external power signal into a combined power signal and to provide the combined power signal as a power signal output.

16. The method of claim 15, further including the step of providing the combined power signal to a wireless access point.

17. The method of claim 16, wherein the wireless access point comprises an antenna.

18. A system for transmitting and receiving power over optical fiber, the system comprising:
an optical transmitter configured to transmit an optical signal having a low frequency power portion and a high frequency data portion;
an optical fiber coupled to the optical transmitter and configured to transport the optical signal;
an optical receiver coupled to the optical fiber and configured to receive the optical signal from the optical fiber and further configured to convert the optical signal into an electrical signal;
an electrical filter including a low pass filter portion having an input electrically coupled to the optical receiver and receiving the electrical signal therefrom, the electrical filter operative to low pass filter the electrical signal received from the optical receiver and to provide the low pass filtered electrical signal as a power output signal;
the electrical filter further having a high pass filter having an input electrically coupled to the output of the optical receiver and operative to high pass filter the electrical signal received from the optical receiver and to provide the high pass filtered electric signal as a data output signal; and
a power combination module having first and second power inputs, and a combination power output, the first power input coupled to the power output signal from the electrical filter and the second power input coupled to an external power source and receiving external power therefrom, the power combination module operative to combine the power output signal and the external power signal into a combined power signal and to provide the combined power signal as a power signal output.

* * * * *